United States Patent [19]

Watanabe et al.

[11] 3,901,953
[45] Aug. 26, 1975

[54] PROCESS FOR MANUFACTURING UNSATURATED POLYESTER RESINS

[75] Inventors: Takeyoshi Watanabe; Morimasa Sato; Wataru Koga, all of Hitachi, Japan

[73] Assignee: Director-General (Mr. Keishin Matsumoto) Agency of Industrial Science & Technology, Tokyo, Japan

[22] Filed: Aug. 30, 1973

[21] Appl. No.: 393,211

[30] Foreign Application Priority Data
Aug. 31, 1972  Japan............................ 47-86603

[52] U.S. Cl........... 260/865; 260/75 P; 260/75 UA; 260/861
[51] Int. Cl... C08f 21/00; C08g 17/10; C08g 51/58
[58] Field of Search...... 260/861, 865, 75 P, 75 UA

[56] References Cited
UNITED STATES PATENTS

| | | | |
|---|---|---|---|
| 2,904,533 | 9/1959 | Carlston et al. | 260/75 |
| 3,042,650 | 7/1962 | Bockstahler | 260/861 |
| 3,196,131 | 7/1965 | Mayer et al. | 260/75 |
| 3,252,941 | 5/1966 | Mayer et al. | 260/75 |
| 3,345,339 | 10/1967 | Parker et al. | 260/75 |
| 3,361,846 | 1/1968 | Gleim et al. | 260/860 |
| 3,404,121 | 10/1968 | Barkey | 260/45.7 |
| 3,427,267 | 2/1969 | Stieger et al. | 260/22 |
| 3,483,151 | 12/1969 | Biarnais et al. | 260/22 |

*Primary Examiner*—Melvin Goldstein
*Assistant Examiner*—E. A. Nielsen
*Attorney, Agent, or Firm*—William J. Daniel

[57] ABSTRACT

In a process for manufacturing unsaturated polyester resins which comprises (A) a stage of reacting a dialkyl terephthalate with a polyhydric alcohol in the presence of an interesterification catalyst, (B) a stage of reacting the reaction product obtained at the stage (A) with an unsaturated dicarboxylic acid, one or more polyhydric alcohols and optionally a saturated dicarboxylic acid to produce an unsaturated alkyd resin and (C) a stage of dissolving the unsaturated alkyd resin obtained at the stage (B) in a vinyl monomer, the reaction at the stage (A) or (B) is carried out in the coexistence of a hydroquinone and a phosphite.

9 Claims, No Drawings

PROCESS FOR MANUFACTURING UNSATURATED POLYESTER RESINS

BACKGROUND OF THE INVENTION

This invention relates to an improvement in the process for manufacturing unsaturated polyester resins. More particularly, this invention relates to an improved process for manufacturing from a dialkyl terephthalate, unsaturated polyester resins which are excellent in mechanical properties and corrosion resistance.

As a general process for manufacturing unsaturated polyester resins, there is known a process wherein an aromatic dicarboxylic acid such as phthalic acid or phthalic anhydride is reacted with one or more polyhydric alcohols plus an unsaturated dicarboxylic acid and the resulting reaction product is dissolved in a vinyl monomer. In this process, the use of isophthalic acid in place of the phthalic acid or phthalic anhydride for the purpose of improving mechanical properties and corrosion resistance of the end product, i.e., the cured product of the unsaturated polyester resin, is already known (E. E. Parker, Ind., Eng. Chem., 58(4), 53 (1966). However, the cured product of an unsaturated polyester resin obtained from isophthalic acid as aromatic dicarboxylic acid component also fails to possess practically satisfactory mechanical properties and corrosion resistance. It is expected that mechanical properties and corrosion resistance of the resin would be improved if in this process dimethyl terephthalate were substituted in place of isophthalic acid. As a polyester derived from dimethyl terephthalate tends to be crystalline, the reaction should be conducted for a long period of time at a sufficiently high temperature. If the extent of reaction is insufficient, the polyester is small in yield and easily tends to crystallinity. Moreover, mechanical properties and corrosion resistance become inferior. This process, moreover, has a fatal drawback; mainly, it requires a high temperature and a long period of time for the reaction between dimethyl terephthalate and one or more polyhydric alcohols so that the resin is obtained only in a gelled or almost gelled form in extremely unstable state and thus unsuited for practical use.

Thus, a practical process for manufacturing unsaturated polyester resins using a terephthalic acid as the aromatic dicarboxylic acid component has not been known hitherto.

BRIEF SUMMARY OF THE INVENTION

It is, therefore, an object of this invention to provide unsaturated polyester resins possessing improved mechanical properties, corrosion resistance and crystallinity.

Another object of this invention is to provide stable unsaturated polyester resins derived from terephthalic acid as the aromatic dicarboxylic acid component.

Still another object of this invention is to provide a process for efficiently manufacturing unsaturated polyester resins of good quality which comprises bringing a dialkyl terephthalate, one or more polyhydric alcohols, an unsaturated dicarboxylic acid and optionally a saturated dicarboxylic acid into reaction at two stages.

Other and further objects, features and advantages of this invention will appear more fully from the following description.

DETAILED DESCRIPTION OF THE INVENTION

In accordance with this invention, the aforementioned objects can be attained by a process comprising (A) a first stage of reacting a dialkyl terephthalate with a polyhydric alcohol in the presence of an interesterification catalyst, (B) a second stage of reacting the reaction product of stage (A) with an unsaturated dicarboxylic acid, one or more polyhydric alcohols and optionally a saturated dicarboxylic acid to produce an unsaturated alkyd resin and (C) a third stage of dissolving the unsaturated alkyd resin obtained from stage (B) in a vinyl monomer, characterized by carrying out the reaction of stage (A) or (B) in the concurrent presence of a hydroquinone and a phosphite.

The term "unsaturated dicarboxylic acid" is used herein to mean a dicarboxylic acid having an unsaturated bond capable of reacting with a vinyl monomer, while the term "saturated dicarboxylic acid" is used herein to mean a dicarboxylic acid having no unsaturated bond capable of reacting with a vinyl monomer.

Terephthalic acid used in this invention as the aromatic dicarboxylic acid component has to be used in the form of a dialkyl ester thereof in which the alkyl moieties are each a lower alkyl group of at most 4 carbon atoms. This is because the free terephthalic acid does not react directly with a polyhydric alcohol even in the presence of an interesterification catalyst.

Examples of the unsaturated dicarboxylic acid used in this invention include maleic acid, maleic anhydride, fumaric acid, itaconic acid and the like. Examples of the saturated dicarboxylic acid used optionally in this invention include phthalic acid, phthalic anhydride, isophthalic acid, adipic acid, sebacic acid, tetrahydrophthalic acid, tetrahydrophthalic anhydride, methyl-tetrahydrophthalic acid, methyl-tetrahydrophthalic anhydride, tetrachlorophthalic anhydride, tetrabromophthalic anhydride, endomethylene tetrahydrophthalic anhydride, chlorendic acid and the like.

On the other hand, examples of the polyhydric alcohol include ethylene glycol, diethylene glycol, propylene glycol, dipropylene glycol, 1,3-butanediol, neopentyl glycol, isopentyl glycol, 1,6-hexanediol and the like.

The vinyl monomer to be mixed with the unsaturated alkyl resin obtained according to the reaction at the stages (A) and (B) of this invention is preferably styrene, vinyltoluene, tert-butylstyrene, chlorostyrene and diallyl phthalate.

The interesterification catalyst used at the stage (A) of this invention is preferably lead acetate, zinc acetate, lead oxide, manganese chloride, alcoholic manganese chloride, etc.

In the practice of this invention, it is indispensable to use a combination of a hydroquinone and a phosphite at stage (A) or (B). The use of only one of the two fails to achieve the desired effect. Examples of suitable hydroquinones include hydroquinone itself, 2,5-di-tert-butylhydroquinone, hydroquinone ethers, bisphenols and resorcinol. Especially preferable are p-dihydroxybenzenes and their derivatives. Examples of the phosphite include monoalkyl phosphites such as monomethyl phosphite and monoethyl phosphite, dialkyl phosphites such as dimethyl phosphite and diethyl phosphite, trialkyl phosphites such as trimethyl phosphite and triethyl phosphite, and phenyl phosphites such as diphenyl phosphite, triphenyl phosphite and tri- (nonylphenyl) phosphite. Especially preferable are trialkyl phosphites and triphenyl phosphites.

The use of too small amounts of the hydroquinone and the phosphites fails to attain satisfactory results, while the use of too large amounts tends to prolong the curing time in the curing treatment. Thus, a combination of the hydroquinone and the phosphite is employed in an amount within a critical range; the hydroquinone is used in an amount of 0.005 – 0.04% by weight, preferably 0.008 –0.02% by weight based on the total amount of the saturated and unsaturated dicarboxylic acids and the polyhydric alcohol, while the phosphite is used in an amount of 0.05 – 0.5% by weight, preferably 0.08 – 0.3% by weight.

In accordance with a preferable embodiment of this invention, a dialkyl terephthalate, a polyhydric alcohol, a hydroquinone and a phosphite are first heated at 200°–250°C in the presence of an interesterification catalyst to effect the interesterification reaction. To the reaction product are then added an unsaturated dicarboxylic acid, a polyhydric alcohol and optionally a saturated dicarboxylic acid. The resulting mixture is heated at 180°–230°C to effect condensation reaction and the product thus obtained is dissolved in a vinyl monomer. A stable, less colored unsaturated polyester resin possessing the desired viscosity, acid number and molecular weight is thus produced.

In accordance with another embodiment of this invention, reaction is carried out first between a dialkyl terephthalate and a polyhydric alcohol in the presence of an interesterification catalyst and then between the reaction product and newly added unsaturated dicarboxylic acid, one or more polyhydric alcohols, a hydroquinone, a phosphite and optionally a saturated dicarboxylic acid and finally the reaction product thus obtained is dissolved in a vinyl monomer. An unsaturated polyester resin excellent in resistance to gelling and in stability during storage is obtained in this way. According to this embodiment, however, the coloration of the product is somewhat inferior as compared with the case of adding a hydroquinone and a phosphite at stage (A) in the first mentioned embodiment.

To further illustrate this invention, but without limiting its scope, the following examples are given wherein parts and percentages are by weight unless otherwise indicated specifically.

Acid number, viscosity, color and curing effect at 80°C referred to in each example were measured according to the method of JIS K6901. Stability during storage was measured, using GE-geltimer at 100°C. To evaluate the rating of interesterification reaction, methanol tolerance at 25°C was used.

EXAMPLE 1

A. In a 2-liter 4-necked flask equipped with a thermometer, a stirrer, a nitrogen gas inlet tube and a partial condenser tube were placed first 693 parts of dimethyl terephthalate and 275 parts of propylene glycol and then 0.28 part of lead acetate, 0.4 part of hydroquinone and 2.2 parts of triphenyl phosphite. While nitrogen gas was passed through the flask, the mixture placed therein was gradually heated up to 230°C with stirring and maintained at this temperature to effect interesterification reaction. When a methanol tolerance reached 2.6 (after a lapse of about 18 hours), the heating was stopped and the reaction product was cooled to 100°C.

B. To the reaction product of stage (A) were added 567 parts of maleic anhydride, 143 parts of propylene glycol and 474 parts of dipropylene glycol. The mixture was heated to 230°C to effect reaction. The progress of the reaction was checked by measurement of the acid number and viscosity of the reaction mixture. At the time the acid number became 14 and the viscosity at 30% styrene content reached 20.5 poises (after about 18 hours), the heating was stopped and the reaction product was cooled.

C. The reaction product of stage (B) was dissolved in 800 parts of styrene to produce a light yellow, transparent unsaturated polyester resin with the characteristic properties as shown in Table 1.

The effect of using hydroquinone alone or p-benzoquinone alone in lieu of a combination of hydroquinone and triphenyl phosphite at stage (A) in this example is also shown in Table 1 as Experiment 2 or 3. In the case of Experiment 2, gelation took place in the course of the reaction so that an unsaturated polyester resin could not be obtained. In the case of Experiment 3, the product was obtained in almost gelled state with an extremely short pot life and was considerably colored so that the product was not suited for practical use.

Table 1

|  |  |  | Experiment | |
|---|---|---|---|---|
|  |  | 1 | 2 | 3 |
| Starting Materials at Stage (A) (pts by weight) | Dimethyl terephthalate | 693.00 | 693.00 | 693.00 |
|  | Propylene glycol | 275.00 | 275.00 | 275.00 |
|  | Lead acetate | 0.28 | 0.28 | 0.28 |
|  | Hydroquinone | 0.40 | 0.60 | — |
|  | p-Benzoquinone | — | — | 0.60 |
|  | Triphenyl phosphite | 2.20 | — | — |
| Additional Materials at Stage (B) | Maleic anhydride | 567.00 | 567.00 | 567.00 |
|  | Propylene glycol | 143.00 | 143.00 | 143.00 |
|  | Diethylene glycol | 474.00 | 474.00 | 474.00 |
| Monomer | Styrene | 800.00 | — | 800.00 |
| Properties of the Resulting Unsaturated Polyester Resin | Acid number | 9.10 | Gelled | 12.00 |
|  | Viscosity (25°C, poises) | 21.00 |  | 49.00 |
|  | Color tone (Gardner color counter) | 3–4 |  | 12–13 |
|  | Curing Effect at 80°C (BPO paste 1%) Gel time (min.) | 4.50 |  | 5.00 |
|  | Cure time (min.) | 6.50 |  | 8.00 |
|  | Exotherm temperature (°C) | 210.00 |  | 187.00 |
|  | Stability on storage (hours) | 8.00 |  | 1.70 |

EXAMPLE 2

A. In accordance with the same procedure as described in Example 1, the A stage reaction was carried out using 428 parts of dimethyl terephthalate, 532 parts of propylene glycol, 0.15 part of lead acetate, 0.40 part of hydroquinone and 2.03 parts of triphenyl phosphite and finished at the time when the methanol tolerance reached 2.5 (after a lapse of about 19 hours).

B. To the reaction product of stage (A) were added 782 parts of maleic anhydride and 301 parts of ethylene glycol. The B stage reaction was then carried out in the same way as described in Example 1 (B). At the time the acid number of the reaction mixture became 16 and the viscosity at 30% styrene content reached 26.8 poises (after a lapse of about 13 hours), the heating was stopped and the reaction product was cooled.

C. The reaction product of stage (B) was dissolved in 800 parts of styrene to produce a light yellow, transparent unsaturated polyester resin with the characteristic properties shown in Table 2.

For the purpose of comparison, similar experiments were repeated, using various polymerization inhibitors singly in place of the combination of hydroquinone and triphenyl phosphite used at the A stage of this example. However, satisfactory results were not obtained in all of the cases. For example, when using 2,5-ditertbutylhydroquinone alone (Exp. 5) or a combination of hydroquinone dimethyl ether and hydroquinone dimethyl ether (Exp. 7) the desired result was not obtained as gelation took place during the B stage reaction. When using 2,5-diphenyl-p-benzoquinone alone (Exp. 6), the B stage reaction could barely be finished with difficulty. Moreover, the product was obtained in virtual gelled state with an extremely short pot life and considerable coloration and hence was not suitable for practical use. The properties of these products are shown also in Table 2.

pletely dissolved in a resin of Exp. 4 and the characteristics of the resin were measured, it was found that the characteristics were almost identical with those given in Table 2. Likewise, 15 parts of poly(methyl methacrylate) as a low contraction-imparting agent were added to 100 parts of the resin of Exp. 4 and the characteristics of the resin were measured. Although the viscosity was increased and white turbidity appeared, no change was found in the curing effect and stability on storage. Thus, this resin seemed to be similar to a low contraction polyester resin generally employed.

EXAMPLE 3

A. In the same way described in Example 1, the A stage reaction was carried out using 536 parts of dimethyl terephthalate, 228 parts of propylene glycol and 0.21 part of lead acetate and concluded when a methanol tolerance of 2.9 was obtained (after a lapse of about 18 hours).

B. To the reaction product of stage (A) were added 734 parts of maleic anhydride, 418 parts of propylene glycol, 290 parts of neopentyl glycol, 0.3 part of hydroquinone and 2.1 parts of triphenyl phosphite. The reaction was carried out according to the procedure described in Example 1. When the acid number of the reaction mixture became 17 and the viscosity of a solution containing 30% styrene reached 2.5 poises (after a lapse of about 10 hours), the heating was stopped and the reaction product was cooled.

C. The reaction product of stage (B) was dissolved in 800 parts of styrene to produce a light yellow, transparent unsaturated polyester resin with the characteristic properties shown in Table 3. This resin was lightly colored but its stability on storage was good.

For the purpose of comparison, similar experiments were repeated, using hydroquinone or p-benzoquinone singly. However, the product obtained was considerably colored and was hort in life and was thus of less commercial value.

TABLE 2

|  |  | 4 | 5 | 6 | 7 |
|---|---|---|---|---|---|
| Starting Materials at Stage (A) (pts by weight) | Dimethyl terephthalate | 428.00 | 428.00 | 428.00 | 428.00 |
|  | Propylene glycol | 532.00 | 532.00 | 532.00 | 532.00 |
|  | Lead acetate | 0.15 | 0.15 | 0.15 | 0.15 |
|  | Hydroquinone | 0.40 | — | — | 0.40 |
|  | 2,5-Di-tert-butylhydroquinone | — | 0.80 | — | — |
|  | 2,5-Diphenyl-p-benzoquinone | — | — | 0.80 | — |
|  | Hydroquinone dimethyl ether | — | — | — | 0.40 |
|  | Triphenyl phosphite | 2.03 | — | — | — |
| Additional Materials at Stage (B) | Maleic anhydride | 782.00 | 782.00 | 782.00 | 782.00 |
|  | Ethylene glycol | 301.00 | 301.00 | 301.00 | 301.00 |
| Monomer | Styrene | 800.00 | — | 800.00 | — |
| Properties of the Resulting Unsaturated Polyester Resin | Acid number | 9.80 | Gelled | 11.20 | Gelled |
|  | Viscosity (25°C, poises) | 28.00 |  | 37.00 |  |
|  | Color tone (Gardner color counter) | 3–4 |  | 13–14 |  |
|  | Curing effect at 80°C (BPO paste 1%) Gel time (min.) | 4.20 |  | 4.80 |  |
|  | Cure time (min.) | 6.00 |  | 7.20 |  |
|  | Exotherm temperature (°C) | 213.00 |  | 193.00 |  |
|  | Stability on storage (hours) | 9.00 |  | 1.20 |  |

When 0.4% of an ultraviolet ray absorbing agent (Tinuvin P," a benzotriazole compound) was com-

TABLE 3

|  |  | Experiment | | |
|---|---|---|---|---|
|  |  | 8 | 9 | 10 |
| Starting Materials at Stage | Dimethyl terephthalate | 536.00 | 536.00 | 536.00 |
|  | Propylene glycol | 228.00 | 228.00 | 228.00 |

TABLE 3-continued

|  |  | Experiment 8 | Experiment 9 | Experiment 10 |
|---|---|---|---|---|
| (A) (pts by weight) | Lead acetate | 0.21 | 0.21 | 0.21 |
| Additional Materials at Stage (B) | Maleic anhydride | 734.00 | 734.00 | 734.00 |
|  | Propylene glycol | 418.00 | 418.00 | 418.00 |
|  | Neopentyl glycol | 290.00 | 290.00 | 290.00 |
|  | Hydroquinone | 0.30 | 0.60 | — |
|  | p-Benzoquinone | — | — | 0.60 |
|  | Triphenyl phosphite | 2.10 | — | — |
| Monomer | Styrene | 800.00 | 800.00 | 800.00 |
| Properties of the Resulting Unsaturated Polyester Resin | Acid number | 11.00 | 14.00 | 10.50 |
|  | Color tone (Gardner color counter) | 4–5 | 8–9 | 12–13 |
|  | Viscosity (25°C, poises) | 20.00 | 28.00 | 26.00 |
|  | Curing effect at 80°C (BPO paste 1%) Gel time (min.) | 5.60 | 7.50 | 6.50 |
|  | Cure time (min.) | 8.00 | 10.40 | 9.80 |
|  | Exotherm temperature (°C) | 195.00 | 173.00 | 182.00 |
|  | Stability on storage (hours) | 9.50 | 0.70 | 0.60 |

What is claimed is:

1. A process for manufacturing unsaturated polyester resins which comprises (A) reacting in a first stage a dialkyl terephthalate with a polyhydric alcohol in the presence of an interesterification reaction catalyst, (B) reacting in a second stage the reaction product of stage (A) with an unsaturated dicarboxylic acid and at least one polyhydric alcohol to produce an unsaturated alkyd resin and (C) finally dissolving the unsaturated alkyd resin obtained from stage (B) in a vinyl monomer, characterized in that the reaction of stage (A) or (B) is carried out in the concurrent presence of a hydroquinone and an alkyl or aryl phosphite.

2. A process according to claim 1 wherein a hydroquinone and a phosphite are present at the beginning of stage (A).

3. A process according to claim 1 wherein a hydroquinone and a phosphite are present at stage (B).

4. A process according to claim 2 wherein stage (A) is carried out in the presence of hydroquinone and triphenyl phosphite. carried 5. A process according to claim 3 wherein stage (B) is carried out in the presence of hydroquinone and triphenyl phosphite.

6. A process according to claim 1 wherein the unsaturated dicarboxylic acid is maleic anhydride.

7. A process according to claim 1 wherein said stage (A) reaction product is reacted in stage (B) with a saturated dicarboxylic acid in addition to said unsaturated dicarboxylic acid and said polyhydric alcohol.

8. A process according to claim 1 wherein said hydroquinone is present in the amount of about 0.005 – 0.04% and said phosphite is present in the amount of about 0.005 – 0.5%, both by weight of the dicarboxylic acid and polyhydric alcohol being reacted.

9. A process according to claim 1 where said stage (A) reaction is carried out at a temperature of about 200°–250°C and said stage (B) reaction is carried out at a temperature of about 180°–230°C.

* * * * *